(12) United States Patent
Namuduri et al.

(10) Patent No.: US 7,624,850 B2
(45) Date of Patent: Dec. 1, 2009

(54) DAMPING DEVICE HAVING CONTROLLABLE RESISTIVE FORCE

(75) Inventors: Chandra S. Namuduri, Troy, MI (US); David S. Rule, Waterford, MI (US); Kenneth J. Shoemaker, Highland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 439 days.

(21) Appl. No.: 11/440,909

(22) Filed: May 25, 2006

(65) Prior Publication Data

US 2007/0045068 A1    Mar. 1, 2007

Related U.S. Application Data

(60) Provisional application No. 60/710,883, filed on Aug. 24, 2005.

(51) Int. Cl.
*F16F 9/53* (2006.01)
(52) U.S. Cl. ..................... 188/267.2; 188/290
(58) Field of Classification Search ............. 188/267.2, 188/267, 266.3, 290
See application file for complete search history.

(56) References Cited

U.S. PATENT DOCUMENTS

| 4,815,575 A | 3/1989 | Murty | 188/299 |
| 5,277,281 A | 1/1994 | Carlson et al. | 188/267 |
| 5,573,088 A * | 11/1996 | Daniels | 188/267 |
| 5,667,715 A | 9/1997 | Foister | 252/62.52 |
| 5,878,997 A * | 3/1999 | Miesner | 267/140.14 |
| 6,390,252 B1 | 5/2002 | Namuduri et al. | 188/267.2 |
| 6,641,166 B2 * | 11/2003 | Browne et al. | 280/752 |
| 2003/0079948 A1 * | 5/2003 | Jolly et al. | 188/267 |
| 2004/0040805 A1 * | 3/2004 | Bailey | 188/267.2 |
| 2005/0121269 A1 | 6/2005 | Namuduri | 188/267.1 |

FOREIGN PATENT DOCUMENTS

| JP | 63009739 A | * | 1/1988 |
| JP | 01216138 A | * | 8/1989 |
| JP | 09264492 A | * | 10/1997 |
| KR | 2003004147 A | * | 1/2003 |

* cited by examiner

*Primary Examiner*—Xuan Lan Nguyen

(57) ABSTRACT

A damper assembly is provided including a linear to rotary motion conversion mechanism having an outer tube member. An inner tube member is reciprocally movable and at least partially disposed within the outer tube member. The inner tube member is adapted for linear translation in a first and a second direction. A rotatable shaft is disposed within the inner tube member. The translation of the inner tube member produces a rotation of the shaft. Also included within the damper assembly is a damping mechanism having a rotor fixed to the shaft. A coil is configured to generate an electromagnetic field in response to an applied current. A magnetorheological fluid is in contact with the rotor, and has a variable viscosity in the presence of the electromagnetic field that, in turn, provides variable resistance to rotation of the rotor and translation of the inner tube member within the outer tube member.

15 Claims, 2 Drawing Sheets

DAMPING DEVICE HAVING CONTROLLABLE RESISTIVE FORCE

CROSS-REFERENCE TO RELATED APPLICATIONS

This application claims the benefit of U.S. Provisional Application 60/710,883 filed Aug. 24, 2005.

TECHNICAL FIELD

The present invention relates to damping devices used in controlled damping applications, such as semi-active vehicle suspension systems.

BACKGROUND OF THE INVENTION

Many vehicle suspension systems utilize damping devices or shock absorbers for controlling the vibrations or oscillations of the body and wheel due to road disturbances imposed on the mass-spring system of the vehicle body/wheel and suspension springs. A vehicle suspension damping device typically provides a resistive force proportional to the relative translational velocity between the body and the wheel. High performance controlled damping applications, such as those used in vehicle suspension systems, preferably provide a relatively low damping force at low speeds for comfort, and provide a relatively high damping force at high speeds for improved vehicle handling. It is known that such response characteristics can be provided by semi-active or active suspension systems, wherein the damping response of the systems can be continuously varied in real time in response to the dynamic conditions experienced by the vehicle using continuously variable real-time damping (CV-RTD) actuators. The use of CV-RTD dampers employing "smart fluids" (e.g., electro-rheological (ER) and magneto-rheological (MR) fluids) with continuously variable and controllable rheology and a fixed flow portion instead of moving mechanical valves with a variable flow portion have been proposed.

Magneto-rheological (MR) fluids consist of magnetizable particles (e.g., iron and/or iron alloy powders) suspended in an inert base fluid (e.g., synthetic oil). MR fluids typically exhibit Newtonian flow characteristics, with negligible yield stress when there is no external magnetic field. However, the yield stress of a MR fluid can be increased by several orders of magnitude by subjecting it to a magnetic field perpendicular to the flow direction of the fluid. This Bingham plastic behavior of MR fluid in an activated state is advantageous in creating actuators with controllable force or torque characteristics such as vibration dampers and clutches, without employing movable valves. Recent advances in material technology and electronics have renewed the interest in MR fluids for applications in smart dampers for fast and efficient control of force or torque (e.g., damping) in a mechanical system.

SUMMARY OF THE INVENTION

A damper assembly is provided having a linear motion to rotary motion conversion mechanism including a generally cylindrical outer tube member and a generally cylindrical inner tube member reciprocally movable and at least partially disposed within the generally cylindrical outer tube member. The generally cylindrical inner tube member is adapted for generally linear translation in a first and a second direction. A shaft is rotatably mounted to, and at least partially disposed with respect to, the generally cylindrical inner tube member. The translation of the generally cylindrical inner tube member in one of the first or the second directions produces a rotation of the shaft. The damper assembly further includes a damping mechanism including a rotor fixed to the shaft and a coil sufficiently configured to generate an electromagnetic field in response to an applied current. A magneto-rheological fluid is provided in contact with the rotor and has a variable viscosity in the presence of the electromagnetic field. The application of the electromagnetic field to the magneto-rheological fluid produces changes in the viscosity of the magneto-rheological fluid that in turn provides variable resistance to rotation of the rotor and translation of the generally cylindrical inner tube member within the generally cylindrical outer tube member.

The damper assembly may further include a nut member mounted with respect to the generally cylindrical inner tube member. The nut member is preferably sufficiently configured to threadably receive the shaft. The nut member operates to cause rotation of the rotatable shaft as the generally cylindrical inner tube member is translated. The nut may have a ball screw configuration. A nut housing may be mounted with respect to the generally cylindrical inner tube member and sufficiently configured to receive at least a portion of the nut member. A bushing may be disposed about the periphery of the nut housing and engageable with an inner surface of the generally cylindrical outer tube member.

The damper assembly may further include an end cap mounted with respect to the generally cylindrical inner tube member. A dust shield may depend or extend from the end cap. The dust shield is preferably sufficiently configured to receive at least a portion of the generally cylindrical outer tube member. The damper may further include a first attachment member operable to mount the damper assembly, wherein the first attachment member is mounted with respect to the generally cylindrical inner tube member. Additionally, the damper assembly may further include a second attachment member operable to mount the damper assembly, wherein the second attachment member is mounted with respect to the damping mechanism.

The rotor may include a hub portion extending generally radially from the rotatable shaft and a drum portion extending generally axially from the hub portion. The hub portion may be formed from non-magnetic material and may define at least one orifice sufficiently configured to promote the movement of the magneto-rheological fluid within the damping mechanism. The drum portion may include a generally annular non-magnetic portion operable to shape the electromagnetic field. The generally annular non-magnetic portion may define at least one orifice sufficiently configured to promote the movement of the magneto-rheological fluid within the damping mechanism. The drum portion may include a surface treatment, such as electro-spark deposition of tungsten carbide, to increase at least one of the surface roughness and wear resistance of the drum portion.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
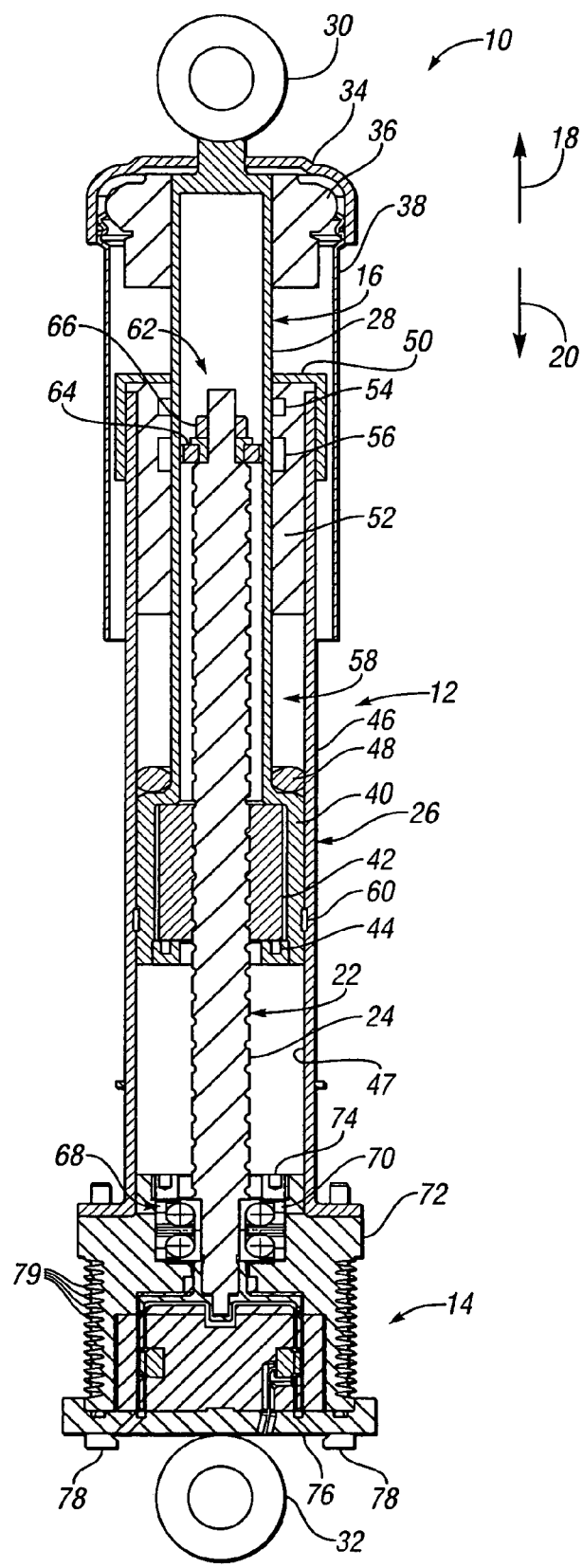
FIG. 1 is a schematic cross-sectional illustration of an magneto-rheological, or MR, fluid damper of the present invention illustrating a linear motion to rotary motion conversion mechanism and a damping mechanism.
Figure 2:
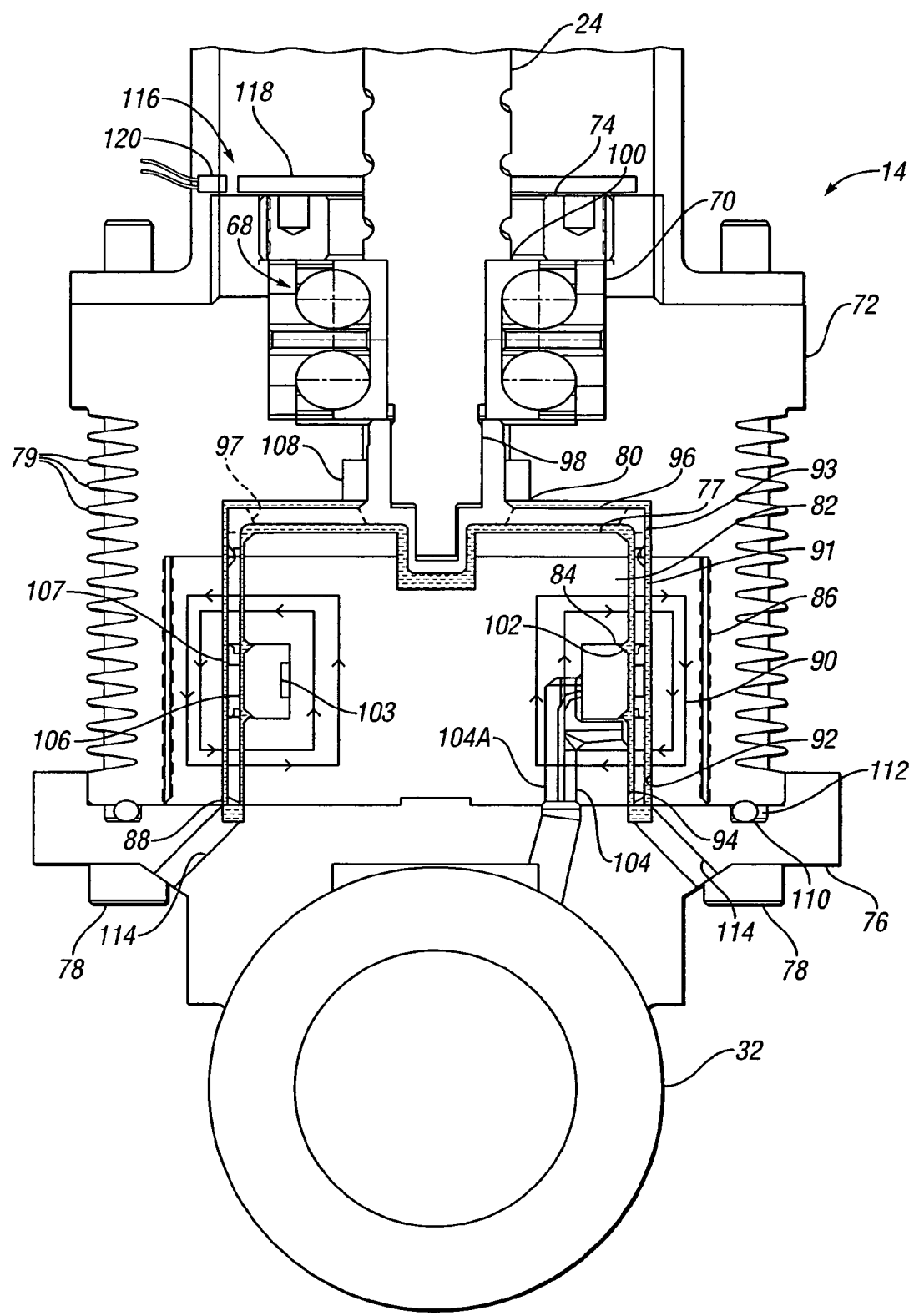
FIG. 2 is a schematic cross sectional illustration of a portion of the damping mechanism shown in FIG. 1.

Referring to FIGS. 1 and 2, this invention may be described generally as an actuator or damper assembly 10, which includes linear motion to rotary motion conversion mechanism 12 for converting linear motion and forces applied to the damper assembly 10 to rotary motion and forces, which may be damped by the operation of a damping mechanism 14. In a vehicular application, the damper assembly 10 may be incorporated into the suspension system as a shock absorber in the spring mass system comprising the vehicle chassis and other sprung masses and the wheels and other unsprung masses. In such systems, the linear motion and force inputs occur as the vehicle is driven and the wheel experiences translational movement relative to the chassis, such as, for example, those caused by variations in the surface that the vehicle is driven on or objects in the path of the wheel.

The linear motion to rotary motion conversion mechanism 12 includes a translatable assembly 16, that is adapted for linear reciprocal translation in both a first direction (indicated by arrow 18) and a second direction (indicated by arrow 20), and a rotatable assembly 22. The rotatable assembly 22 includes a shaft 24 that is rotatably coupled to the translatable assembly 16 through a coupling assembly 26, such that translation of the translatable assembly 16 in one of the first 18 and the second 20 directions produces rotation of the rotatable assembly 22 and shaft 24. Linear translation is intended to also encompass linear motion to rotary motion conversion mechanisms 12 wherein the translatable assembly 16 provides linear or curvilinear translation. In addition to movement, these members also generally transmit linear and rotational forces associated with their movement. Furthermore, while the description above assumes the motion of these members during the operation of damper assembly 10, it should be noted that damping mechanism 14 might also be operated to substantially resist or prevent the motion of these members, such that they transmit linear and rotational forces without any associated movement.

The translatable assembly 16 includes a generally cylindrical hollow inner tube member 28 having a first attachment member 30. The first attachment member 30 and a second attachment member 32 cooperate with fasteners, not shown, and elastomeric bushings, not shown, to fixedly mount the damper assembly 10 such as, for example, within a vehicle suspension system. The inner tube member 28 is preferably made from steel or other materials capable of providing the structural strength required by the damper assembly 10. An end cap 34 is provided on the inner tube member 28, and is operable to retain a bumper member 36 and a dust shield 38. The bumper member 36 is preferably made from an elastomeric material and operates to lessen the impact during full compression of the damper assembly 10. The shape, size, and material properties of the bumper member 36 are application specific to the damper assembly 10. The dust shield 38 is a generally cylindrical hollow tube operable to disallow external debris from reaching the inner tube member 28. The dust shield 38 may be made from materials such as metals, plastics, or composites since the dust shield 38 is not a stressed member of the damper assembly 10. A nut housing 40 is provided at an end of the inner tube member 28 opposite the first attachment member 30. The nut housing 40 may be any suitable shape, but is preferably a hollow cylinder and may be made from any material that is capable of transmitting the axial loads and torques that result from operation of the damper assembly, such as structural metals (e.g., iron, steel, aluminum, titanium or other structural alloys) or structural composites (e.g., fiber reinforced engineering plastics). The nut housing 40 is operable to receive a nut 42 and may be formed integrally with the inner tube member 28, as shown in FIG. 1, or may be a separate member fixedly attached to the inner tube member 28. The nut 42 is sufficiently configured to threadably receive the shaft 24. The nut 42 is secured from relative rotation and translation with respect to the nut housing 40 via a fastener 44. The nut 42 is preferably a ball screw nut, which translates generally coaxially along the shaft 24. However, the nut 42 may also be a roller screw nut or a simple low friction acme nut capable of being back driven. In lieu of these nut housing 40 and fastener 44 attachment methods, those skilled in the art will recognize other methods of attaching the inner tube member 28 to the nut 42, such as treaded engagement, brazing, welding, press fit/staking, etc.

The translatable assembly 16 is reciprocally movable within an outer tube member 46. The outer tube member 46 supports the axial motion of the inner tube member 28 and is preferably made from steel or similar metallic materials. The inner surface 47 may be coated with a low friction and high wear resistant material such as chrome. A bumper member 48 is mounted with respect to the inner tube member 28 and the nut housing 40 and operates to lessen the impact forces during full extension of the inner tube member 28 with respect to the outer tube member 46. The bumper member 48 is preferably formed from an elastomeric material; however, those skilled in the art will recognize that other materials may be suitable depending on the intended application of the damper assembly 10. A retaining cap 50 is attached to one end of the outer tube member 46, and operates to secure a bushing and a seal retaining member 52 with respect to the inner tube member 28 and the outer tube member 46. The bushing and seal retaining member 52 in the preferred embodiment is formed from metal and its axial length determines the maximum extension of the damper assembly 10. The bushing and seal retaining member 52 retains a generally annular seal 54 and a bushing 56 with respect to the inner tube member 28. The seal 54 prevents debris from entering the bushing 56 and the variable volume 58 formed between the inner tube member 28 and the outer tube member 46. The seal 54 is preferably formed from an elastomeric material. The bushing 56 is a low friction bushing, which may be integral to the bushing and seal retaining member 52 or may be a separate unit secured thereon. Additionally, the bushing 56 may be a dry or lubricated. A generally annular low friction bushing 60 is disposed around the outer periphery of the nut housing 40 and operates to provide a low friction interface between the nut housing 40 and the outer tube member 46.

A support assembly 62 includes a low friction bearing 64 and a fastener 66. The support assembly 62 provides support to the shaft 24, which is rotatable with respect to the inner tube member 28. The fastener 66 operates to retain the bearing 64 with respect to the shaft 24. The shaft 24 as shown in FIGS. 1 and 2 is configured to cooperate with the nut 42 to convert the linear translational movement of the nut 42 into rotary movement of the shaft 24 that can be resisted by a the damping mechanism 14, the operation of which is to be described hereinafter. As mentioned hereinabove, the nut 42 in the preferred embodiment is a ball screw nut. The shaft 24 is preferably formed from a single material, such as a structural metal (e.g., cast iron, steel, aluminum, titanium or other structural metal alloys). The shaft 24 is preferably configured to have a ball circle diameter between 10 mm and 25 mm and a lead ranging from 10 mm to 25 mm. The shaft 24 is rotatably supported on the end opposite the support assembly 62 by a bearing 68. The bearing 68 is preferably a double angular contact ball bearing, however the bearing 68 may be any type that allows free rotation of the shaft 24 and withstands the thrust loads generated during the extension and compression of the damper assembly 10. An outer race 70 of the bearing 68 is secured to a non-magnetic housing 72 via a nut 74. The housing 72 cooperates with a non-magnetic end cap 76 to contain components of the damping mechanism 14. The outer tube member 46, housing 72, and end cap 76 are joined using a plurality of fasteners 78. The housing 72 is preferably made from a highly thermally conductive material such as aluminum. A plurality of spaced cooling fins 79 are provided on the periphery of the housing 72 to aid in the dissipation of heat energy generated by the operation of the damping mechanism 14.

Referring now to FIG. 2, and with continued reference to FIG. 1, the damping mechanism 14 utilizes a coaxial rotary configuration for generating a resistance or damping force. The damping mechanism 14 generally includes a rotor 80, a magnetically permeable core 82, a coil 84, a magnetically permeable flux ring 86, and a fluid 88. The fluid preferably has a viscosity that may be continuously varied with application of a electro-magnetic field 90 of varying intensity. A drum portion 91 of the rotor 80 is coaxially disposed within a gap 93 defined by an inner surface 92 of the flux ring 86 and an outer surface 94 of the core 82. The fluid 88 is disposed within the gap 93 and is in touching contact with the drum portion 91 of the rotor 80, the inner surface 92 of the flux ring 86, and the outer surface of the core 82. The application of variable electromagnetic field 90 to the fluid 88 produces changes in the viscosity of the fluid 88 that in turn provides variable resistance to rotation of the rotor 80 through fluid 88 and translation of translatable assembly 16. The flux ring 86 is preferably made from low carbon steel or powdered iron. The flux ring 86 is held concentric to the drum portion 91 of the rotor 80 by the housing 72. Preferably, the flux ring 86 will be threaded into the housing 72, thereby ensuring proper contact between the flux ring 86 and the housing 72 to maximize thermal conductivity.

The rotor 80 includes a hub portion 96 that extends radially inward from the drum portion 91. The hub portion 96 is fixed to shaft 24 though threaded engagement with a threaded portion 98 of the shaft 24. The hub portion 96 secures an inner race 100 of the bearing 68 to the shaft 24. The hub portion 96 may be fixed to the shaft 24 using other known joining methods, such as an interference fit, welding, brazing, staking, etc. The center length of the shaft 24 within the threaded portion 98 is hardened such that the shaft 24 can withstand the compressive and tensile forces acting thereon. The hub portion 96 is preferably a non-magnetic material, such as austenitic steel, aluminum or other non-magnetic material. Additionally, the hub portion 96 may define a plurality of holes or orifices 97, shown as dashed lines, spaced radially therein. The orifices 97 promote the movement of the fluid 88 near the hub portion 96, thereby avoiding the unintentional lock up of the rotor 82 due to particle stacking within the fluid 88. The drum portion 91 is formed from a magnetic material, such as magnetic steel. Additionally, the drum portion 91 may have a coating or surface treatment, such as an electro-spark deposition of tungsten carbide, or similar materials and processes, to increase the wear resistance and roughness of the drum portion 91. By increasing the hardness of the drum portion 91, wear as a result of contact with the fluid 88 will be reduced. Additionally, by increasing the roughness of the drum portion 91, the effectiveness of the damper mechanism will increase. The core 82 is formed from a magnetic material, such as low carbon steel, powdered iron, or laminated steel and is secured to the end cap 76. A non-magnetic plate 77 is fixed to the core 82 to shape the electro-magnetic field 90.

The coil 84 has a plurality of windings operable to selectively generate the electro-magnetic field 90 when the coil 84 is energized with electrical current. The coil 84 is located within an annular recess 102 that is defined by the core 82. The coil 84 may also include a permanent magnet 103 operable to provide a magnetic field in the case of a current disruption to the coil 84. A plurality of electrical conductors 104 and 104A are sealed coil leads that may be externally terminated and are operable to communicate an electrical current to energize the coil 84. The strength of the electro-magnetic field 90 is proportional to the current applied, which in turn controls the viscosity of MR fluid 88 and the rotational resistance of the rotor 80. The drum portion 91 also preferably incorporates a generally annular non-magnetic ring 106 opposite the coil 84, which operates to shape magnetic field 90 such that the lines of magnetic flux are substantially perpendicular to the gap 93. The non-magnetic ring 106 may be formed from any non-magnetic material, including non-magnetic metals and plastics. The non-magnetic ring 106 may extend through the entire thickness of the drum portion 91 or inserted into a groove that extends substantially through the thickness of the drum portion 91. Additionally, the non-magnetic ring 106 may define a plurality of circumferentially spaced holes or orifices 107 extending through the non-magnetic ring 106. The orifices 107 promote the movement of the fluid 88 near the non-magnetic ring 106 within the gap 93, thereby avoiding the unintentional lock up of the rotor 82 due to particle stacking within the fluid 88.

A dynamic rotary seal 108 is provided between the housing 72 and the hub portion 96 of the rotor 80. The seal 108 operates to prevent loss of fluid 88 from the damping mechanism 14. Preferably, the seal 108 is formed from a material capable of withstanding a temperature range of −40 degrees C. to +200 degrees C. A static seal 110, such as an elastomeric o-ring, is provided within a recess 112 defined by the end cap 76. The seal 110 prevents leakage of the fluid 88 from the housing 72 to end cap 76 interface. A plurality of fill passages 114 may be defined by the end cap 76 to facilitate the filling of the damping mechanism 14 with fluid 88.

In operation of the damper assembly 10, when there is zero current through the coil 84, the rotor 80 provides minimal resistance to linear motion of the damper assembly 10. The resistance is a function of the actuator geometry, the MR fluid viscosity, the pitch or lead of the treads on shaft 24 and nut 42, and frictional resistance between the shaft 24 and nut 42, etc. Additionally, the permanent magnet 103 will provide a magnetic field 90 to provide a default viscosity value to the MR fluid 88. If a current is provided to the coil 84 from an external current driver (not shown), the electro-magnetic field 90 is generated and acts upon the MR fluid 88 thereby increasing the resistance to rotation of the rotor 80, and the shaft 24 mounted thereto. The increased viscosity of fluid 88 as a result of the electro-magnetic field 90 results in increased yield stress to be overcome for the rotor 80 to rotate through the fluid 88. This translates to an increased force of resistance to the linear translation of the damper assembly 10. By controlling the amount of current provided to the coil 84, the resistance or damping force can be selectively and variably controlled. Thus, the linear motion to rotary motion conversion mechanism 12 and damping mechanism 14 work together as a controllable resistance device or damper with respect to the system to which it is attached at the first and second attachment members 30 and 32, such as in a vehicular suspension system.

Fluid 88 is preferably an MR fluid. For an MR fluid which utilizes iron particles in a carrier fluid base, such as mineral oil or synthetic oil, having a viscosity of about 50-5000 centipoise and a density of about 2-5 grams per cubic centimeter at +40 degrees Celsius, it is believed that iron particles having a diameter in the range of about 100 nanometers to 80 micrometers in a concentration of about 0.15 to 0.6 volume fraction is preferred. It should be understood that the optimal formulation of the MR fluid is based upon the damping force requirements for a given application.

A sensor assembly 116 is provided to determine the rotational position and/or rotational speed of the shaft 24. The sensor assembly 116 is preferably a Hall effect sensor assembly, however those skilled in the art will recognize other sensor assemblies capable of sensing the rotational position and/or speed of the shaft 24. A target wheel 118 is affixed to the shaft 24 for unitary rotation therewith. A sensor 120 is operable to sense a target, such as a magnet or a tooth, located on the target wheel 118 to provide an electronic control unit, or ECU, (not shown) with rotational position information of the shaft 24. Since the rotational speed of the shaft 24 is proportional to the translational speed of the translatable assembly 16, the ECU can readily calculate the translational speed and or position of the damper assembly 10.

While the best modes for carrying out the invention have been described in detail, those familiar with the art to which this invention relates will recognize various alternative designs and embodiments for practicing the invention within the scope of the appended claims.

The invention claimed is:

1. A damper assembly comprising:
   a linear motion to rotary motion conversion mechanism including;
      an outer tube member;
      an inner tube member reciprocally movable and at least partially disposed within said outer tube member, wherein said inner tube member is adapted for generally linear translation in a first and a second direction;
      a shaft rotatably mounted to and at least partially disposed with respect to said inner tube member;
      wherein translation of said inner tube member in one of said first or said second directions produces a rotation of said shaft;
   a damping mechanism including;
      a rotor fixed to said shaft wherein said rotor includes;
         a hub portion extending generally radially from said rotatable shaft, wherein said hub portion is formed from non-magnetic material and defines at least one orifice; and
         a drum portion extending generally axially from said hub portion;
      a coil sufficiently configured to generate an electromagnetic field in response to an applied current;
      a magneto-rheological fluid in contact with said rotor, said magneto-rheological fluid having a variable viscosity in the presence of said electromagnetic field; and
      wherein application of said electromagnetic field to said magneto-rheological fluid produces changes in the viscosity of said magneto-rheological fluid that in turn provides variable resistance to rotation of said rotor and translation of said inner tube member within said outer tube member; and
      wherein said at least one orifice defined by said hub portion is sufficiently configured to promote the movement of said magneto-rheological fluid within said damping mechanism.

2. The damper assembly of claim 1, further comprising:
   a nut member mounted with respect to said inner tube member;
   wherein said nut member is sufficiently configured to threadably receive said shaft; and
   wherein said nut member is operable to cause rotation of said rotatable shaft as said inner tube member is translated.

3. The damper assembly of claim 2, wherein said nut has a ball screw configuration.

4. The damper assembly of claim 2, further comprising:
   a nut housing mounted with respect to said inner tube member and sufficiently configured to receive at least a portion of said nut member; and
   a bushing disposed about the periphery of said nut housing and engageable with an inner surface of said outer tube member.

5. The damper assembly of claim 1, further comprising:
   an end cap mounted with respect to said inner tube member;
   a dust shield depending or extending from said end cap; and
   wherein said dust shield is sufficiently configured to receive at least a portion of said outer tube member.

6. The damper assembly of claim 1, further comprising:
   a first attachment member operable to mount the damper assembly, wherein said first attachment member is mounted with respect to said inner tube member; and
   a second attachment member operable to mount the damper assembly, wherein said second attachment member is mounted with respect to said damping mechanism.

7. The damper assembly of claim 1, wherein said drum portion includes a generally annular non-magnetic portion operable to shape said electromagnetic field.

8. The damper assembly of claim 7, wherein said generally annular non-magnetic portion defines at least one orifice sufficiently configured to promote the movement of said magneto-rheological fluid within said damping mechanism.

9. The damper assembly of claim 1, wherein the drum portion includes a surface treatment to increase at least one of the surface roughness and wear resistance of said drum portion.

10. The damper assembly of claim 9, wherein said surface treatment is electro-spark deposition of tungsten carbide.

11. The damper assembly of claim 1, further comprising a sensor assembly operable to determine at least one of rotational velocity and position of said shaft.

12. A damper assembly comprising:
    a linear motion to rotary motion conversion mechanism including;
       a generally cylindrical outer tube member;
       a generally cylindrical inner tube member reciprocally movable and at least partially disposed within said generally cylindrical outer tube member, wherein said generally cylindrical inner tube member is adapted for generally linear translation in a first and a second direction;
       a shaft rotatably mounted with respect to and at least partially disposed within said inner tube member;
       wherein translation of said generally cylindrical inner tube member in one of said first or said second directions produces a rotation of said shaft;
       a nut member mounted with respect to said generally cylindrical inner tube member, wherein said nut member is sufficiently configured to threadably receive said shaft and wherein said nut member is operable to cause rotation of said shaft as said generally cylindrical inner tube member is translated in one of said first and second direction;

a damping mechanism including;

a housing;

a rotor fixed to said rotatable shaft;

a coil sufficiently configured to generate a variable electromagnetic field in response to an applied current;

a magneto-rheological fluid in contact with said rotor, said magneto-rheological fluid having a variable viscosity in the presence of said electromagnetic field;

wherein said housing is sufficiently configured to receive at least portions of said coil, said rotor, and said magneto-rheological fluid;

wherein application of said variable electromagnetic field to said magneto-rheological fluid produces changes in the viscosity of said magneto-rheological fluid that in turn provides variable resistance to rotation of said rotor and translation of said generally cylindrical inner tube member within said generally cylindrical outer tube member; and a nut housing mounted with respect to said generally cylindrical inner tube member and sufficiently configured to receive at least a portion of said nut member; and a bushing disposed about the periphery of said nut housing and engageable with an inner surface of said generally cylindrical outer tube member.

13. The damper assembly of claim 12, wherein said rotor includes:

a hub portion extending generally radially from said rotatable shaft;

a drum portion extending generally axially from said hub portion; and wherein at least one of said hub portion and said drum portion defines at least one orifice sufficiently configured to promote the movement of said magneto-rheological fluid within said damping mechanism.

14. The damper assembly of claim 12, wherein said rotor includes:

a hub portion extending generally radially from said rotatable shaft;

a drum portion extending generally axially from said hub portion; and wherein said drum portion includes an electro-spark deposition of tungsten carbide to increase the surface roughness and wear resistance of said drum portion.

15. The damper assembly of claim 12, wherein said rotor includes:

a hub portion extending generally radially from said rotatable shaft;

a drum portion extending generally axially from said hub portion; and wherein said drum portion includes a generally annular non-magnetic portion operable to shape said electromagnetic field.

* * * * *